(12) United States Patent
Vankamamidi et al.

(10) Patent No.: US 11,513,956 B2
(45) Date of Patent: Nov. 29, 2022

(54) MAINTAINING AVAILABILITY OF A NON-VOLATILE CACHE

(71) Applicant: EMC IP Holding Company LLC, Hopkinton, MA (US)

(72) Inventors: Vamsi K. Vankamamidi, Hopkinton, MA (US); Geng Han, Beijing (CN); Chun Ma, Beijing (CN); Jianbin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 17/220,317

(22) Filed: Apr. 1, 2021

(65) Prior Publication Data
US 2022/0318141 A1 Oct. 6, 2022

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................................................. G06F 12/0802
USPC ........................................................ 711/118
See application file for complete search history.

(56) References Cited

U.S. PATENT DOCUMENTS

| | | | |
|---|---|---|---|
| 6,021,408 A | 2/2000 | Ledain et al. | |
| 7,904,682 B2 | 3/2011 | Boyd et al. | |
| 9,122,588 B1 | 9/2015 | Mondal et al. | |
| 9,933,952 B1 | 4/2018 | Li et al. | |
| 10,049,055 B2 | 8/2018 | Mondal et al. | |
| 10,146,624 B1 | 12/2018 | Gong et al. | |
| 2003/0191916 A1* | 10/2003 | McBrearty | G06F 11/1464 711/112 |
| 2004/0054851 A1* | 3/2004 | Acton | G06F 11/1441 711/170 |
| 2006/0277380 A1 | 12/2006 | Sicola | |
| 2009/0271645 A1 | 10/2009 | Mori | |
| 2014/0149669 A1* | 5/2014 | Kim | G06F 12/0893 711/119 |
| 2018/0095662 A1 | 4/2018 | Brennan et al. | |
| 2019/0163409 A1 | 5/2019 | Li et al. | |
| 2019/0391889 A1 | 12/2019 | Luo et al. | |
| 2020/0133772 A1 | 4/2020 | Dalmatov et al. | |
| 2022/0129191 A1 | 4/2022 | Ma et al. | |

* cited by examiner

Primary Examiner — Jae U Yu
(74) Attorney, Agent, or Firm — BainwoodHuang

(57) ABSTRACT

A technique maintains availability of a non-volatile cache. The technique involves arranging a plurality of non-volatile random-access memory (NVRAM) drives into initial drive sets that form the non-volatile cache. The technique further involves detecting a failed initial drive set among the initial drive sets. The plurality of NVRAM drives now includes failed NVRAM drives that belong to the failed initial drive set and remaining non-failed NVRAM drives. The technique further involves, in response to detecting the failed initial drive set, re arranging the remaining non-failed NVRAM drives of the plurality of NVRAM drives into new drive sets that form the non-volatile cache.

20 Claims, 9 Drawing Sheets

MAINTAINING AVAILABILITY OF A NON-VOLATILE CACHE

BACKGROUND

In typical data storage systems, storage processors perform data storage operations on behalf of host computers. Such data storage systems typically include caches that sit between the storage processors and secondary (or backend) storage.

Such a cache may be formed from non-volatile random-access memory (NVRAM). Compared to ordinary solid state disk (SSD) storage, NVRAM may provide higher performance/lower latency.

SUMMARY

In a particular data storage system, the cache may include fixed physically paired NVRAM disks (i.e., fixed disk pairs) which hold a logger tier. Data that is en route from a storage processor to secondary storage is cached within the logger tier.

When each fixed disk pair is healthy, the data storage system is in an optimal mode because each fixed disk pair is able to store mirroring copies of data for redundancy. Accordingly, if one NVRAM disk of a particular fixed disk pair fails, the logger tier remains intact and the data storage system is able to continue operation in a degraded mode where the other NVRAM disk of the particular fixed disk pair continues to store data.

However, if the other NVRAM disk of the particular fixed disk pair fails, the data storage system must be brought offline. In particular, the portion of the logger tier formed by that particular fixed disk pair is now inaccessible thus preventing the data storage system from performing further data storage operations. Unfortunately, the data storage system must remain offline until the particular fixed disk pair is repaired.

In contrast to the above-described situation, improved techniques are directed to maintaining availability of a non-volatile cache by utilizing virtual NVRAM drive sets (e.g., virtual drive pairs). Here, NVRAM drives may be configured into initial virtual drive sets that form the non-volatile cache. However, if all of the NVRAM drives of an initial virtual drive set were to fail, the remaining NVRAM drives may be reconfigured into new virtual drive sets that form the non-volatile cache (e.g., where each new virtual drive set includes at least one NVRAM drive). Accordingly, non-volatile cache availability is maintained even if all of the NVRAM drives of an initial virtual drive set are lost.

One embodiment is directed to a method of maintaining availability of a non-volatile cache. The method includes arranging a plurality of NVRAM drives into initial drive sets that form the non-volatile cache. The method further includes detecting a failed initial drive set among the initial drive sets. The plurality of NVRAM drives now includes failed NVRAM drives that belong to the failed initial drive set and remaining non-failed NVRAM drives. The method further includes, in response to detecting the failed initial drive set, re arranging the remaining non-failed NVRAM drives of the plurality of NVRAM drives into new drive sets that form the non-volatile cache.

Another embodiment is directed to data storage equipment including memory and control circuitry coupled to the memory. The memory stores instructions which, when carried out by the control circuitry, cause the control circuitry to perform a method of:

(A) arranging a plurality of NVRAM drives into initial drive sets that form a non-volatile cache,
(B) detecting a failed initial drive set, the plurality of NVRAM drives now including failed NVRAM drives that belong to the failed initial drive set and remaining non-failed NVRAM drives, and
(C) in response to detecting the failed initial drive set, re arranging the remaining non-failed NVRAM drives of the plurality of NVRAM drives into new drive sets that form the non-volatile cache.

Yet another embodiment is directed to a computer program product having a non-transitory computer readable medium which stores a set of instructions to maintain availability of a non-volatile cache. The set of instructions, when carried out by computerized circuitry, causes the computerized circuitry to perform a method of:

(A) arranging a plurality of NVRAM drives into initial drive sets that form the non-volatile cache;
(B) detecting a failed initial drive set, the plurality of NVRAM drives now including failed NVRAM drives that belong to the failed initial drive set and remaining non-failed NVRAM drives; and
(C) in response to detecting the failed initial drive set, re arranging the remaining non-failed NVRAM drives of the plurality of NVRAM drives into new drive sets that form the non-volatile cache.

In some arrangements, arranging the plurality of NVRAM drives into the initial drive sets includes creating a number of initial drive sets from the plurality of NVRAM drives. Additionally, rearranging the remaining non-failed NVRAM drives includes creating a number of new drive sets from the remaining non-failed NVRAM drives that equals the number of initial drive sets created from the plurality of NVRAM drives.

In some arrangements, the failed initial drive set includes a pair of NVRAM drives. Additionally, detecting the failed initial drive set includes sensing that each NVRAM drive of the pair of NVRAM drives has failed.

In some arrangements, the plurality of NVRAM drives includes a first group of NVRAM drives that receives power from a first battery backup unit (BBU) and a second group of NVRAM drives that receives power from a second BBU. Additionally, arranging the plurality of NVRAM drives into the initial drive sets includes creating each initial drive set from an NVRAM drive of the first group and an NVRAM drive of the second group.

In some arrangements, the method further includes, prior to detecting the failed initial drive set, copying data from a buffer of a storage processor into each NVRAM drive of the failed initial drive set. Additionally, the method further includes, in response to detecting the failed initial drive set, copying the data from the buffer of the storage processor into standby storage.

In some arrangements, the method further includes, after re arranging the remaining non-failed NVRAM drives of the plurality of NVRAM drives into the new drive sets, loading the copied data from the standby storage into one of the new drive sets.

In some arrangements, the method further includes, after re arranging the remaining non-failed NVRAM drives of the plurality of NVRAM drives into the new drive sets, reloading the copied data into the buffer of the storage processor.

In some arrangements, the method further includes, prior to detecting the failed initial drive set, performing data storage operations from the storage processor, the data storage operations caching data within log-structured storage provided by the non-volatile cache.

In some arrangements, the method further includes, in response to detecting the failed initial drive set, halting a datapath that includes the log-structured storage. Additionally, the method further includes, after the copied data is loaded from the standby storage into the one of the new drive sets and after the copied data is reloaded into the buffer of the storage processor, resuming the datapath that includes the log-structured storage.

In some arrangements, arranging the plurality of NVRAM drives into initial drive sets that form the non-volatile cache includes constructing initial virtual NVRAM storage objects from the plurality of NVRAM drives. Each initial virtual NVRAM storage object includes a pair of NVRAM drives operating as a mirror to store mirroring copies of data.

In some arrangements, rearranging the remaining non-failed NVRAM drives of the plurality of NVRAM drives includes constructing new virtual NVRAM storage objects from the remaining non failed NVRAM drives of the plurality of NVRAM drives. Each new virtual NVRAM storage object includes a pair of NVRAM drives operating as a mirror to store mirroring copies of data.

In some arrangements, the failed initial drive set includes a pair of NVRAM drives. Additionally, the method further includes, prior to detecting the failed initial drive set, operating the pair of NVRAM drives in an optimal state in which each of a first NVRAM drive and a second NVRAM drive of the pair of NVRAM drives stores a respective copy of data to form a mirror.

In some arrangements, the method further includes, after the pair of NVRAM drives operates in the optimal state and prior to detecting the failed initial drive set, operating the pair of NVRAM drives in a degraded state in which one of first and second NVRAM drives has failed and another of the first and second NVRAM drives continues to store a respective copy of the data.

In some arrangements, detecting the failed initial drive set includes detecting that each of the first NVRAM drive and the second NVRAM drive of the pair of NVRAM drives has failed. Since the initial drive set is virtual (e.g., a software defined virtual pair instead of a fixed/physical pair), another virtual drive set may be created to replace the initial drive set.

It should be understood that, in the cloud context, at least some electronic circuitry (e.g., hosts, backup sites, etc.) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, componentry, computer program products, and so on. Some embodiments are directed to various methods, electronic components and circuitry which are involved in maintaining availability of a non-volatile cache.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to maintaining availability of a non-volatile cache by utilizing virtual non-volatile random-access memory (NVRAM) drive sets (e.g., virtual pairs of NVRAM drives). Here, NVRAM drives may be configured into initial virtual drive sets that form the non-volatile cache. During operation, if all of the NVRAM drives of an initial virtual drive set were to fail, the remaining NVRAM drives may be reconfigured into new virtual drive sets that form the non-volatile cache. Accordingly, non-volatile cache availability is maintained even if all of the NVRAM drives of an initial virtual drive set are lost.

Figure 1:
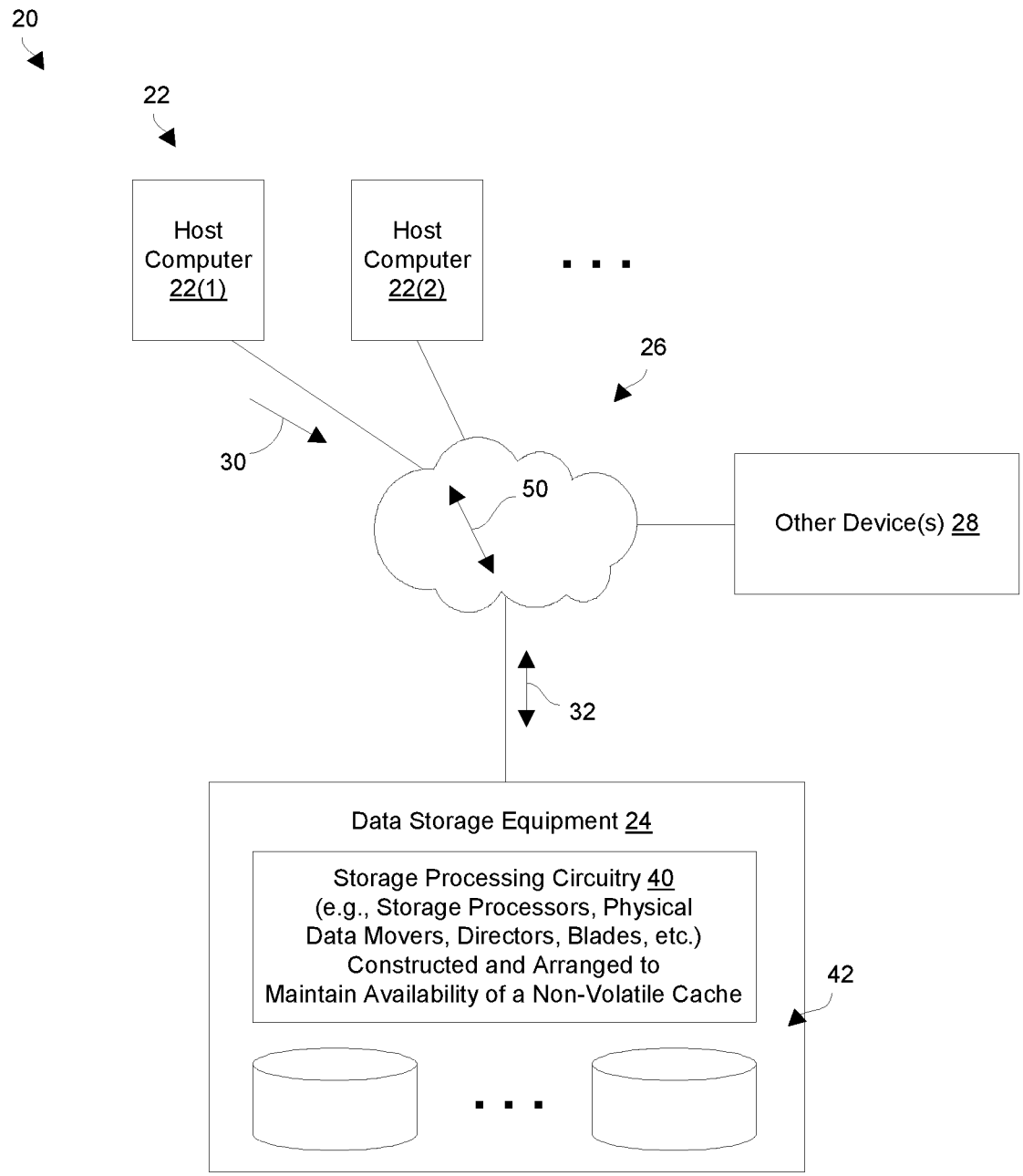
FIG. 1 is a block diagram of a data storage environment that maintains availability of a non-volatile cache in accordance with certain embodiments.

FIG. 1 shows a data storage environment 20 that maintains availability of a non-volatile cache in accordance with certain embodiments. The data storage environment 20 includes host computers 22(1), 22(2), . . . (collectively, host computers 22), data storage equipment 24, a communications medium 26, and perhaps other devices 28.

Each host computer 22 is constructed and arranged to perform useful work. For example, one or more of the host computers 22 may operate as a file server, a web server, an email server, an enterprise server, a database server, a transaction server, combinations thereof, etc. which provides host input/output (I/O) requests 30 to the data storage equipment 24. In this context, the host computers 22 may provide a variety of different I/O requests 30 (e.g., block and/or file based write commands, block and/or file based read commands, combinations thereof, etc.) that direct the data storage equipment 24 to store host data 32 within and retrieve host data 32 from storage (e.g., primary storage or main memory, secondary storage, tiered storage, combinations thereof, etc.).

The data storage equipment 24 includes storage processing circuitry 40 and storage devices 42 (e.g., RAM, NVRAM, other solid state memory, hard disk drives (HDDs), combinations thereof, etc.). The storage processing circuitry 40 is constructed and arranged to respond to the host I/O requests 30 from the host computers 22 by writing data 44 into the storage devices 42 and reading the data 44 from the storage devices 42. The storage processing circuitry 40 may include one or more storage processors or engines, data movers, director boards, blades, I/O modules, storage device controllers, switches, other hardware, combinations thereof, and so on.

As will be explained in further detail shortly, at least some of the storage devices 42 are NVRAM drives which may be arranged to form a non-volatile cache that includes software defined virtual pairs of NVRAM drives. Each virtual pair holds mirroring copies of data for fault tolerance. The storage space provided by the virtual pairs is used for log-structured storage in accordance with a mapped-RAID architecture.

While processing the host I/O requests 30, the storage processing circuitry 40 stores the data 44 within the log-structured storage. Additionally, the storage processing circuitry 40 may provide a variety of specialized datapath services and data storage features such as garbage collection, tiering, deduplication, compression, encryption, snapshotting, backup/archival services, replication and/or failover to other data storage equipment, data recovery, and so on.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

The other devices 28 represent other possible componentry of the data storage environment 20. Along these lines, the other devices 28 may include remote data storage equipment that provides user data 44 to and/or receives user data 44 from the data storage equipment 24 (e.g., replication arrays, backup and/or archiving equipment, service processors and/or management/control devices, etc.).

During operation, the storage processing circuitry 40 of the data storage equipment 24 performs data storage operations to richly and robustly store the data 44 within the storage devices 42. Along these lines, the storage processing circuitry 40 writes new data and updates existing data by writing the data 44 to the non-volatile cache formed from the virtual pairs of NVRAM drives.

When both NVRAM drives of each virtual pair are healthy, the data storage equipment 24 is considered to be in an optimal state. In particular, the data storage equipment 24 the NVRAM cache is fully intact and, if there is a failure of an NVRAM drive of a virtual pair, the data storage equipment 24 may continue NVRAM cache operation.

However, if both NVRAM drives of a particular virtual pair were to fail, the data storage equipment 24 is able to automatically rearrange the remaining non-failed NVRAM drives to reform the non-volatile cache to maintain availability of the non-volatile cache. In particular, the data storage equipment 24 creates new virtual pairs with at least one NVRAM drive by itself (e.g., referred to as a degraded virtual pair). In this situation, the data storage equipment 24 is considered to be in a degraded state, but the non-volatile cache remains in operation thus avoiding transitioning to a data unavailable (DU) state. Further details will now be provided with reference to FIG. 2.

Figure 2:
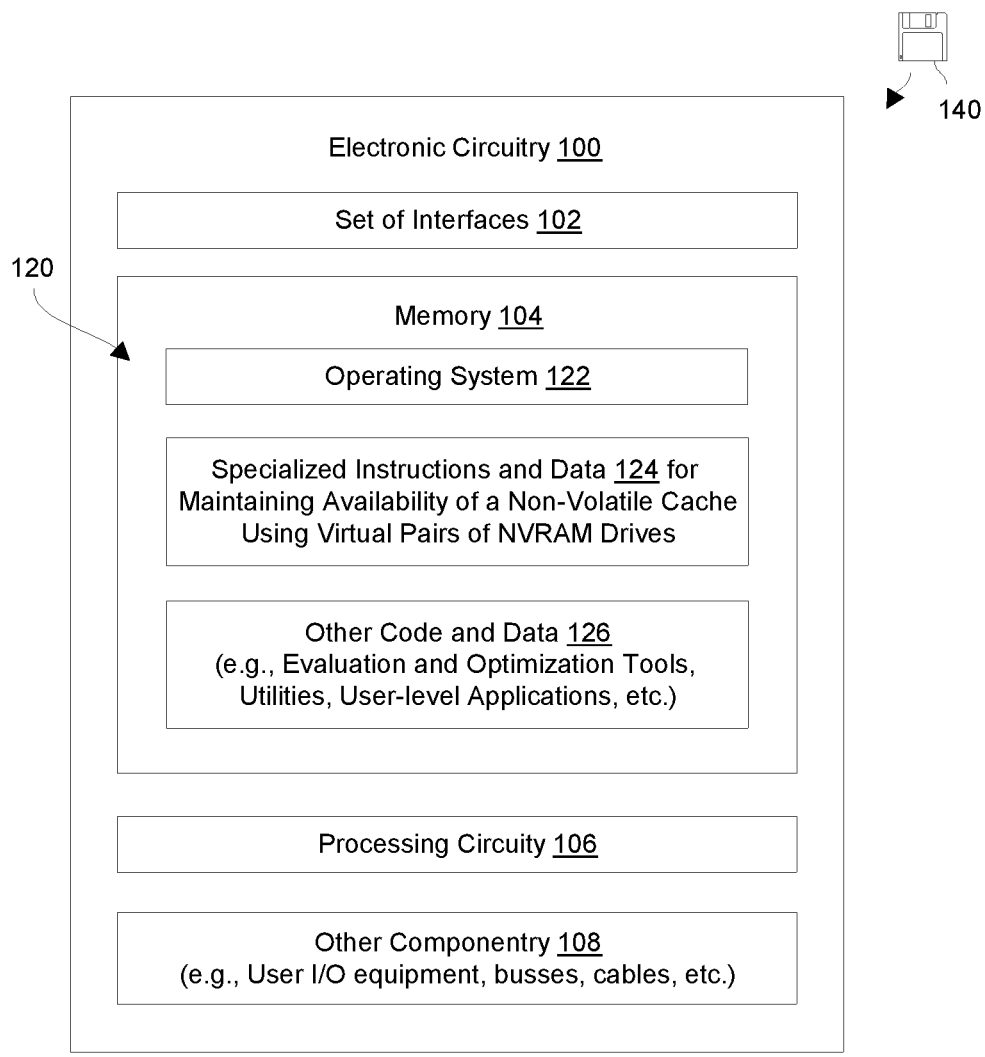
FIG. 2 is a block diagram of electronic circuitry which is suitable for use within the data storage environment in accordance with certain embodiments.

FIG. 2 show electronic circuitry 100 which is suitable for use for at least a portion of the data storage equipment 24 (also see FIG. 1) in accordance with certain embodiments. The electronic circuitry 100 includes a set of interfaces 102, memory 104, and processing circuitry 106, and other circuitry (or componentry) 108.

The set of interfaces 102 is constructed and arranged to connect the electronic circuitry 100 to the communications medium 26 (also see FIG. 1) to enable communications with other devices of the data storage environment 20 (e.g., the host computers 22). Such communications may be IP-based, SAN-based, cellular-based, cable-based, fiber-optic based, wireless, cloud-based, combinations thereof, and so on. Accordingly, the set of interfaces 102 may include one or more host interfaces (e.g., a computer network interface, a fibre-channel interface, etc.), one or more storage device interfaces (e.g., a host adapter or HBA, etc.), and other interfaces. As a result, the set of interfaces 102 enables the electronic circuitry 100 to robustly and reliably communicate with other external apparatus.

The memory 104 is intended to represent both volatile storage (e.g., DRAM, SRAM, etc.) and non-volatile storage (e.g., flash memory, magnetic memory, etc.). The memory 104 stores a variety of software constructs 120 including an operating system 122, specialized instructions and data 124, and other code and data 126. The operating system 122 refers to particular control code such as a kernel to manage computerized resources (e.g., processor cycles, memory space, etc.), drivers (e.g., an I/O stack), and so on. The specialized instructions and data 124 refers to particular instructions for maintaining the non-volatile cache. In some arrangements, the specialized instructions and data 124 is tightly integrated with or part of the operating system 122 itself. The other code and data 126 refers to applications and routines to provide additional operations and services (e.g., performance measurement tools, etc.), user-level applications, administrative tools, utilities, and so on.

The processing circuitry 106 is constructed and arranged to operate in accordance with the various software constructs 120 stored in the memory 104. As will be explained in further detail shortly, the processing circuitry 106 executes the operating system 122 and the specialized code 124 to form specialized circuitry that robustly and reliably manages host data on behalf of a set of hosts (also see FIG. 1). Such processing circuitry 106 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on.

In the context of one or more processors executing software, a computer program product 140 is capable of delivering all or portions of the software constructs 120 to the electronic circuitry 100. In particular, the computer program product 140 has a non-transitory (or non-volatile) computer readable medium which stores a set of instructions that controls one or more operations of the electronic circuitry 100. Examples of suitable computer readable storage media include tangible articles of manufacture and apparatus which store instructions in a non-volatile manner such as DVD, CD-ROM, flash memory, disk memory, tape memory, and the like.

The other componentry 108 refers to other hardware of the electronic circuitry 100. Along these lines, the electronic circuitry 100 may include special user I/O equipment (e.g., a service processor), busses, cabling, adaptors, auxiliary apparatuses, other specialized data storage componentry, etc.

It should be understood that the specialized circuitry formed by the processing circuitry 106 operating in accordance with the software constructs 120 may create an NVRAM cache from virtual pairs of NVRAM drives, and may maintain availability of the NVRAM cache even after failure of all of the NVRAM drives of a virtual pair. In particular, when the specialized circuitry detects failure of all of the NVRAM drives of a virtual pair, the specialized circuitry is able to re-configure the remaining NVRAM drives to re-create the NVRAM cache and continue operation. Further details will now be provided with reference to FIGS. 3 and 4.

Figure 3:
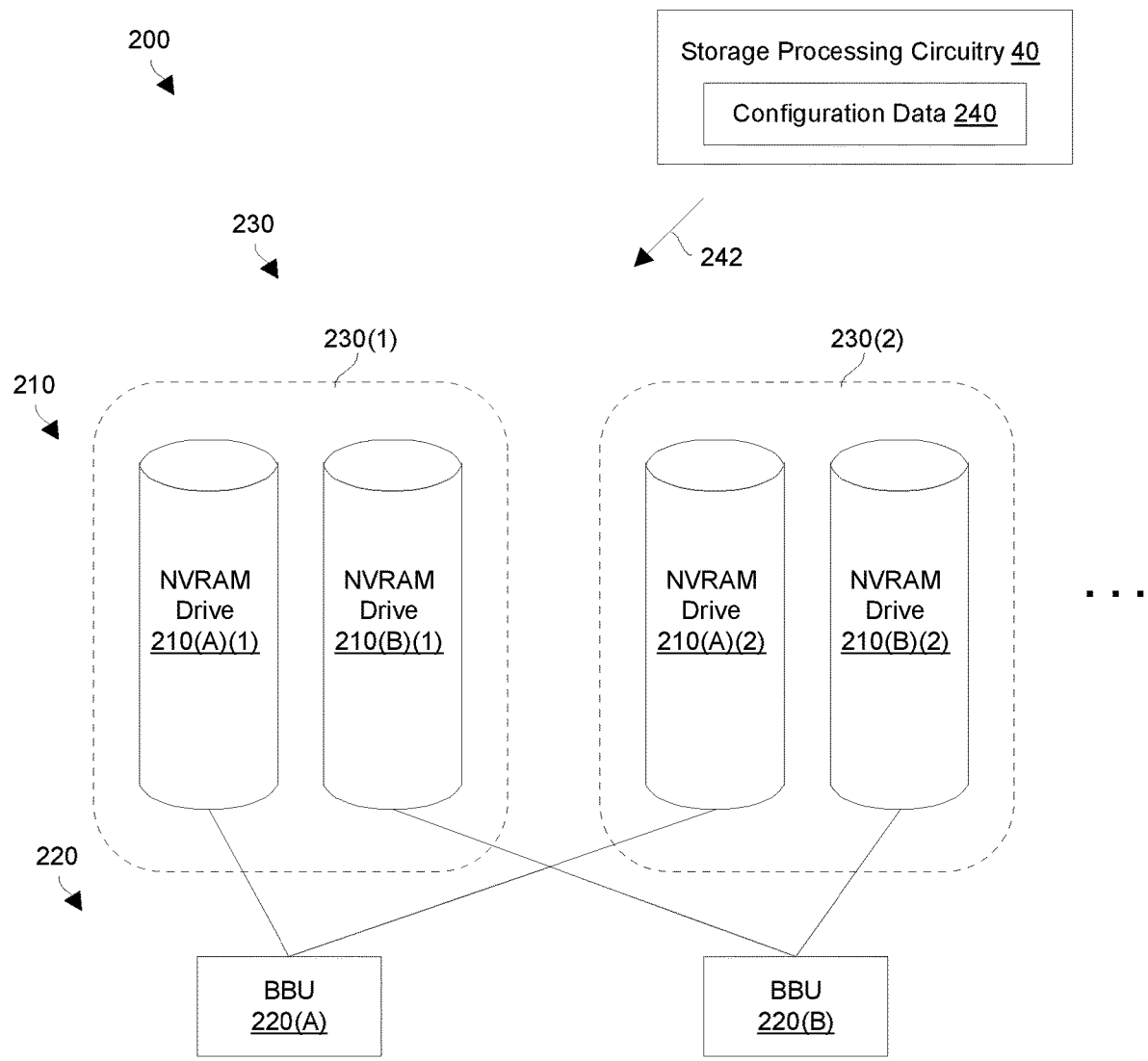
FIG. 3 is a block diagram illustrating particular details of an example non-volatile cache configuration in accordance with certain embodiments.
Figure 4:
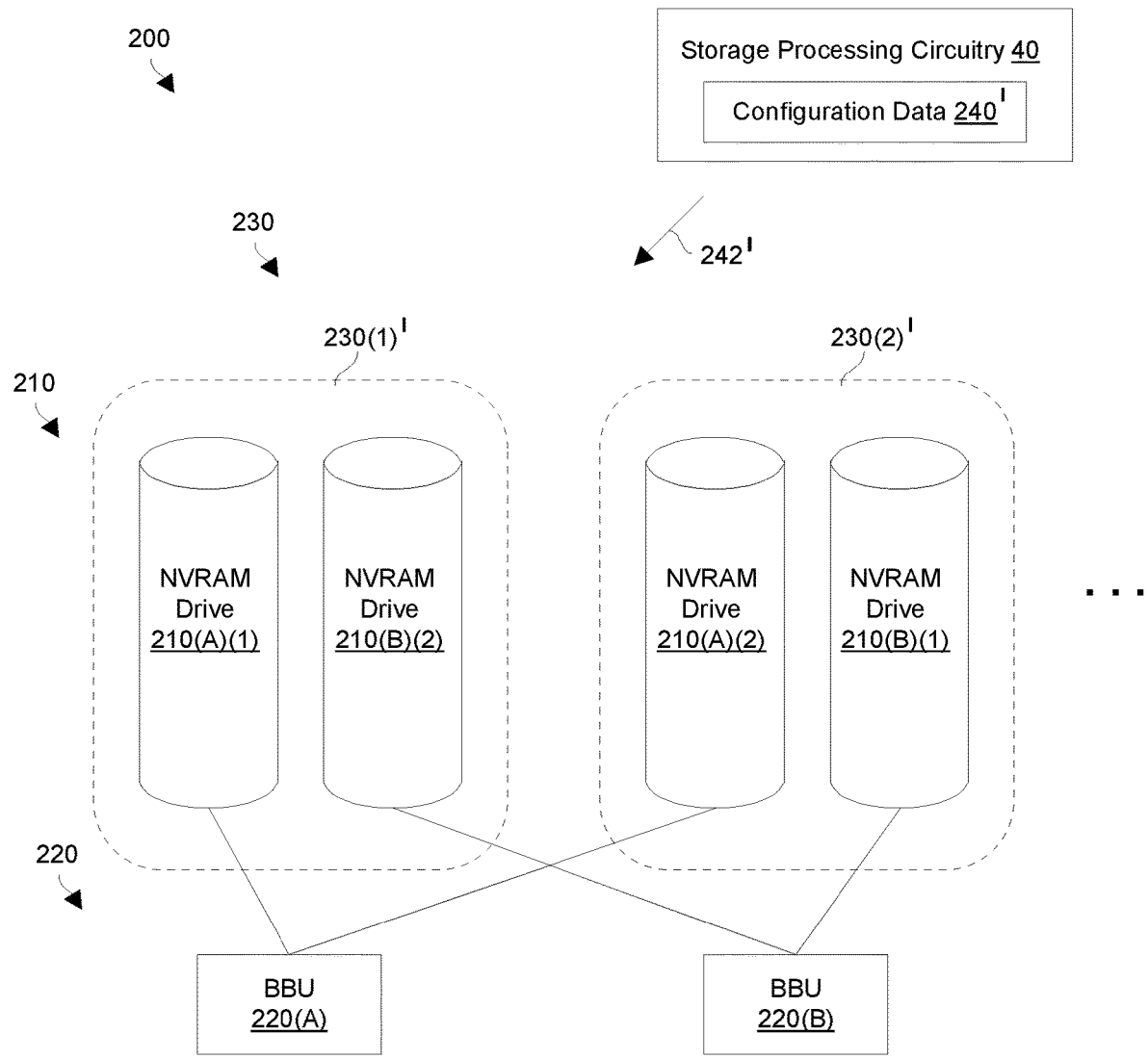
FIG. 4 is a block diagram illustrating particular details of another example non-volatile cache configuration in accordance with certain embodiments.

FIGS. 3 and 4 show certain configuration details for a non-volatile cache 200. FIG. 3 shows a first configuration. FIG. 4 shows a second configuration that is different from the first configuration.

As shown in FIG. 3, a non-volatile cache 200 is formed from NVRAM drives 210 (also see the storage devices 42 in FIG. 1) which connect to battery backup units (BBUs) 220. In particular, the NVRAM drives 210(A)(1), 210(A)(2) connect to the BBU 220(A). Similarly, the NVRAM drives 210(B)(1), 210(B)(2) connect to the BBU 220(B).

To form the non-volatile cache 200, the storage processing circuitry 40 configures the NVRAM drives 210 into virtual pairs 230 (i.e., software-based groupings of NVRAM drives 210). In particular, the storage processing circuitry 40 manages configuration data 240 (also see the special instructions and data 124 in FIG. 2) that configures the NVRAM drives 210(A)(1), 210(B)(1) to operate as a first virtual pair 230(1). Likewise, the storage processing circuitry 40 manages the configuration data 240 to configure the NVRAM drives 210(A)(2), 210(B)(2) to operate as a second virtual pair 230(2). The arrow 242 illustrates this feature for software defined virtual pairs 230 imposed by the storage processing circuitry 40. It should be appreciated that the storage processing circuitry 40 purposefully groups the NVRAM drives 210 so that each virtual pair 230 includes NVRAM drives 210 that connect to different BBUs 220 when possible.

The NVRAM drives 210 of each virtual pair 230 store mirroring copies of data. Accordingly, if one of the NVRAM drives 210 of a particular virtual pair 230 fails, the same data is still available in the remaining (i.e., non-failed) NVRAM drive 210 of the particular virtual pair 230.

By way of example, the non-volatile cache 200 includes two virtual pairs 230. However, it should be understood that the non-volatile cache 200 may include more than just two virtual pairs 230 (e.g., three, four, etc.).

In accordance with certain embodiments, the non-volatile cache 200 provides log-structured storage in accordance with a mapped-RAID architecture to cache data in the datapath en route to lower level storage (e.g., a tier of solid state drives (SSDs), a tier of magnetic hard disk drives (HDDs), combinations thereof, etc.).

One should appreciate that, since all of the NVRAM drives 210 are currently healthy, the non-volatile cache 200 is currently in an optimal state in that the non-volatile cache 220 is rich with fault tolerant redundancy. For example, if one of NVRAM drives 210 of a particular virtual pair 230 fails, the non-volatile cache 220 transitions from the optimal state to a degraded state, but nevertheless remains operational using the other remaining (non-failed) NVRAM drive 210 of the particular virtual pair 220.

Similarly, since the storage processing circuitry 40 has purposefully grouped the NVRAM drives 210 for the virtual pairs 230 such that each virtual pair 230 includes NVRAM drives 210 connected to different BBUs 220, the non-volatile cache 220 remains operational even if one of the BBUs 220 fails. For example, if the BBU 220(A) fails, the NVRAM drives 210(A)(1), 210(A)(2) may lose BBU support. However, the BBU 220(B) remains operational thus providing continuing BBU support to the NVRAM drive 210(B)(1) in the virtual pair 230(1) and the NVRAM drive 210(B)(2) in the virtual pair 230(2). As a result, the non-volatile cache 220 continues to remain protected against data loss. Further details will now be provided with reference to FIG. 4.

FIG. 4 shows various details regarding an alternative configuration for the non-volatile cache 200. For this configuration, the storage processing circuitry 40 manages configuration data 240' to create a first virtual pair 230(1)' that includes NVRAM drives 210(A)(1), 210(B)(2), and a second virtual pair 230(2)' that includes NVRAM drives 210(A)(2), 210(B)(1). The arrow 242' illustrates this feature for different software defined virtual pairs 230 imposed by the storage processing circuitry 40 compared to those of FIG. 3.

As in the first configuration shown in FIG. 3, the storage processing circuitry 40 purposefully groups the NVRAM drives 210 in the second configuration shown in FIG. 4 so that each virtual pair 230 includes NVRAM drives 210 that connect to different BBUs 220 when possible. That is, each virtual pair 230 includes NVRAM drives 210 connected to different BBUs 220.

Accordingly, the non-volatile cache 220 remains operational even if one of the BBUs 220 fails. For example, if the BBU 220(B) fails, the NVRAM drives 210(B)(1), 210(B)(2) may lose BBU support. However, the BBU 220(A) remains operational thus providing continuing BBU support to the NVRAM drive 210(A)(1) in the virtual pair 230(1)' and the NVRAM drive 210(A)(2) in the virtual pair 230(2)'. As a result, the non-volatile cache 220 continues to remain protected against data loss.

It should appreciated that, with the above-described flexibility of creating virtual pairs 230 using different combinations of NVRAM drives 210, the storage processing circuitry 40 may re-configure the NVRAM drives 210 even if all of the NVRAM drives 210 of a particular virtual pair 230 are lost. Accordingly, the storage processing circuitry 40 may reform the non-volatile cache 200 to maintain availability.

Such maintained availability would not be possible for a non-volatile cache formed by fixed (i.e., rigidly arranged) physical pairs of NVRAM drives when all of the NVRAM drives of a particular fixed pair are lost. Further details will now be provided with reference to FIGS. 5 through 8.

Figure 5:
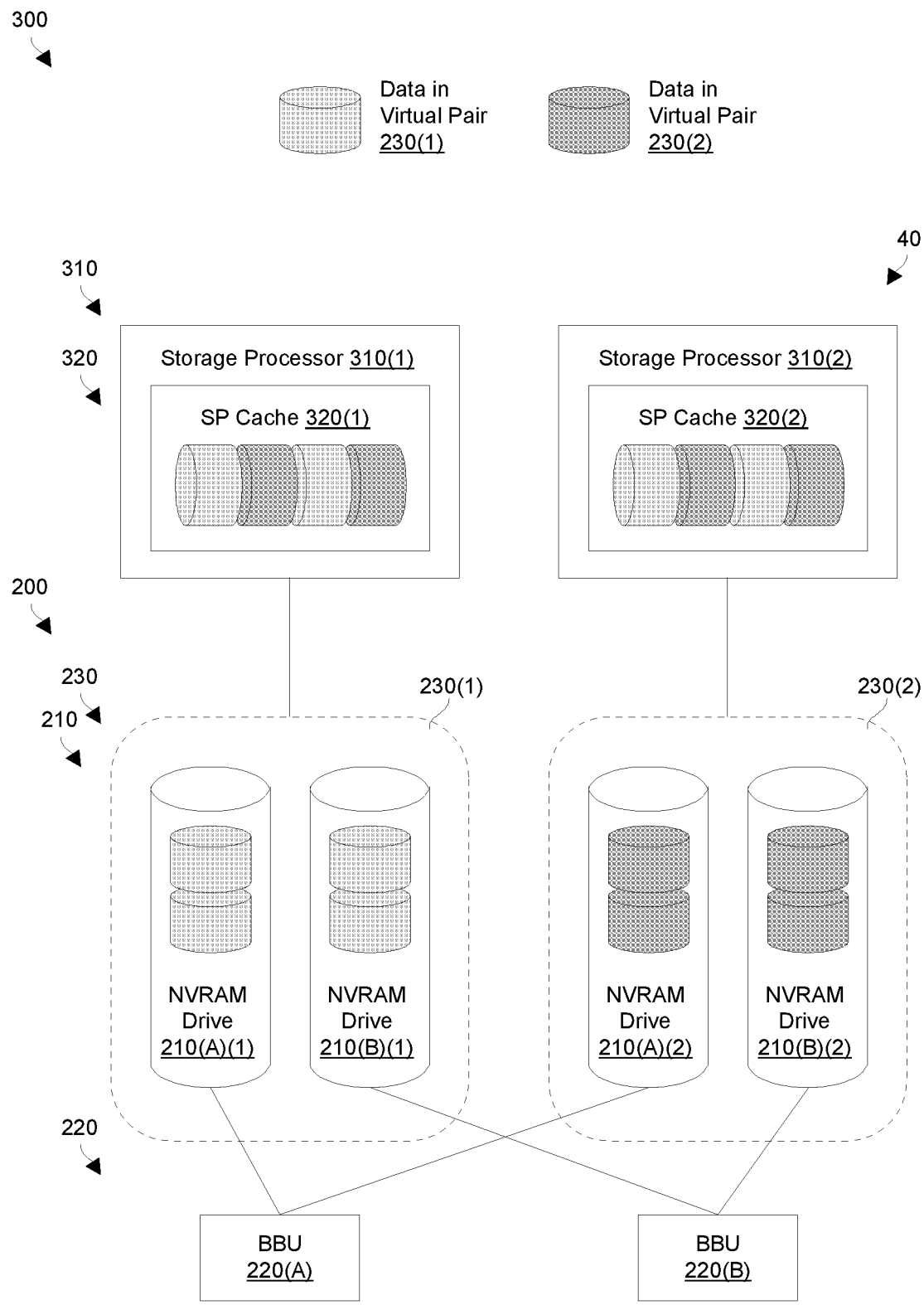
FIG. 5 is a block diagram of an example non-volatile cache at a first time during virtual pair reconfiguration.
Figure 6:
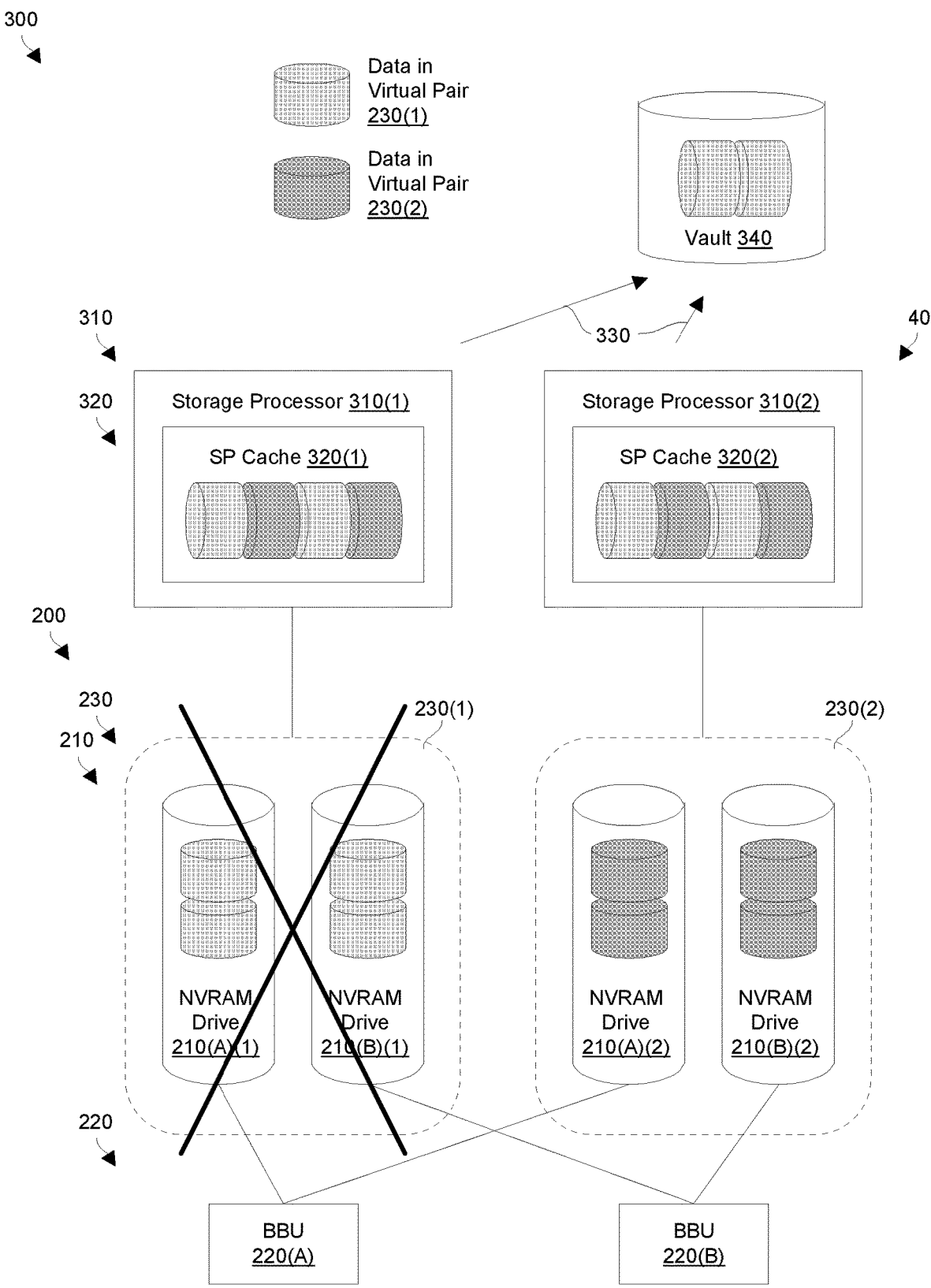
FIG. 6 is a block diagram of the example non-volatile cache at a second time during virtual pair reconfiguration.
Figure 7:
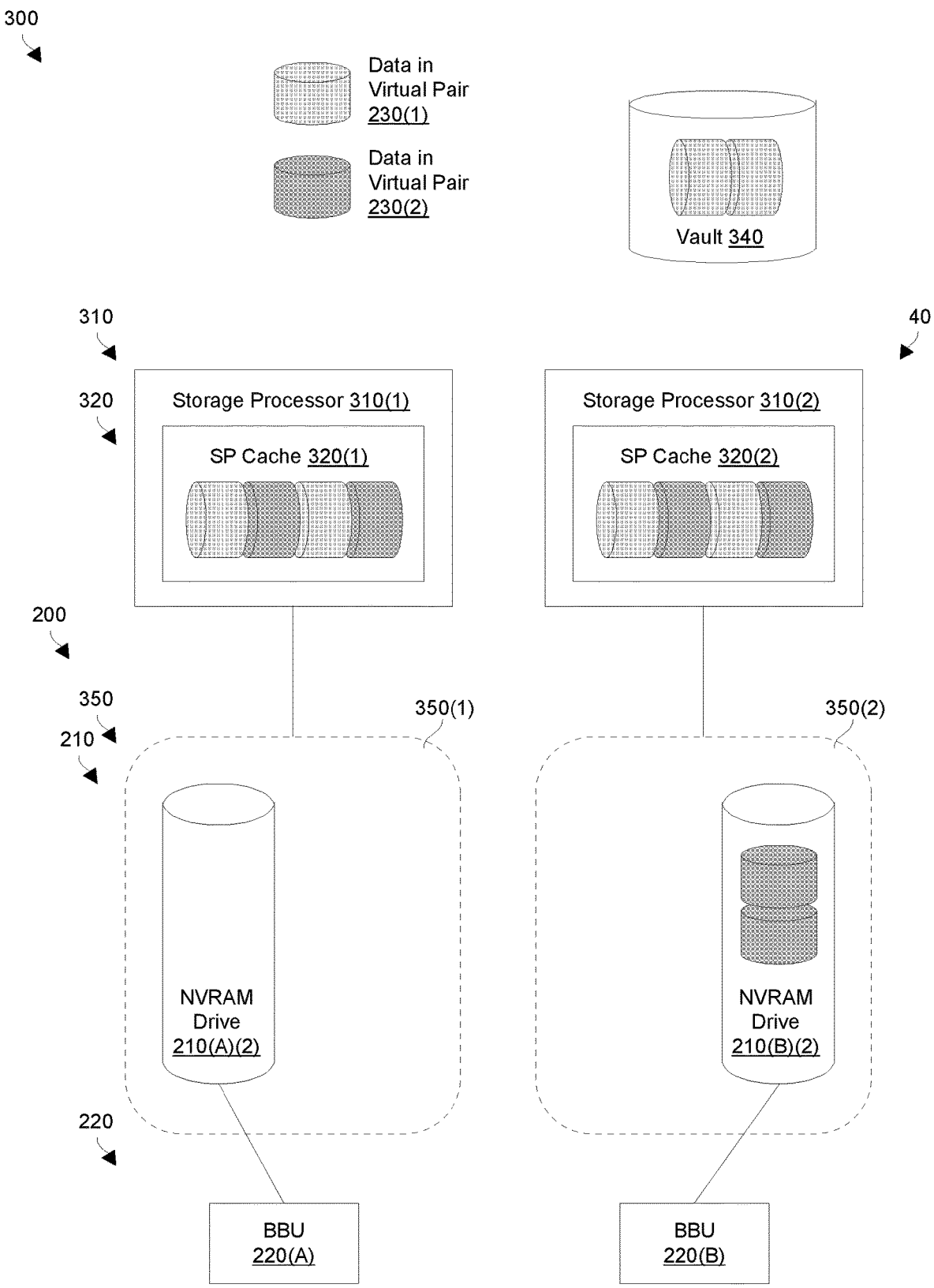
FIG. 7 is a block diagram of the example non-volatile cache at a third time during virtual pair reconfiguration.
Figure 8:
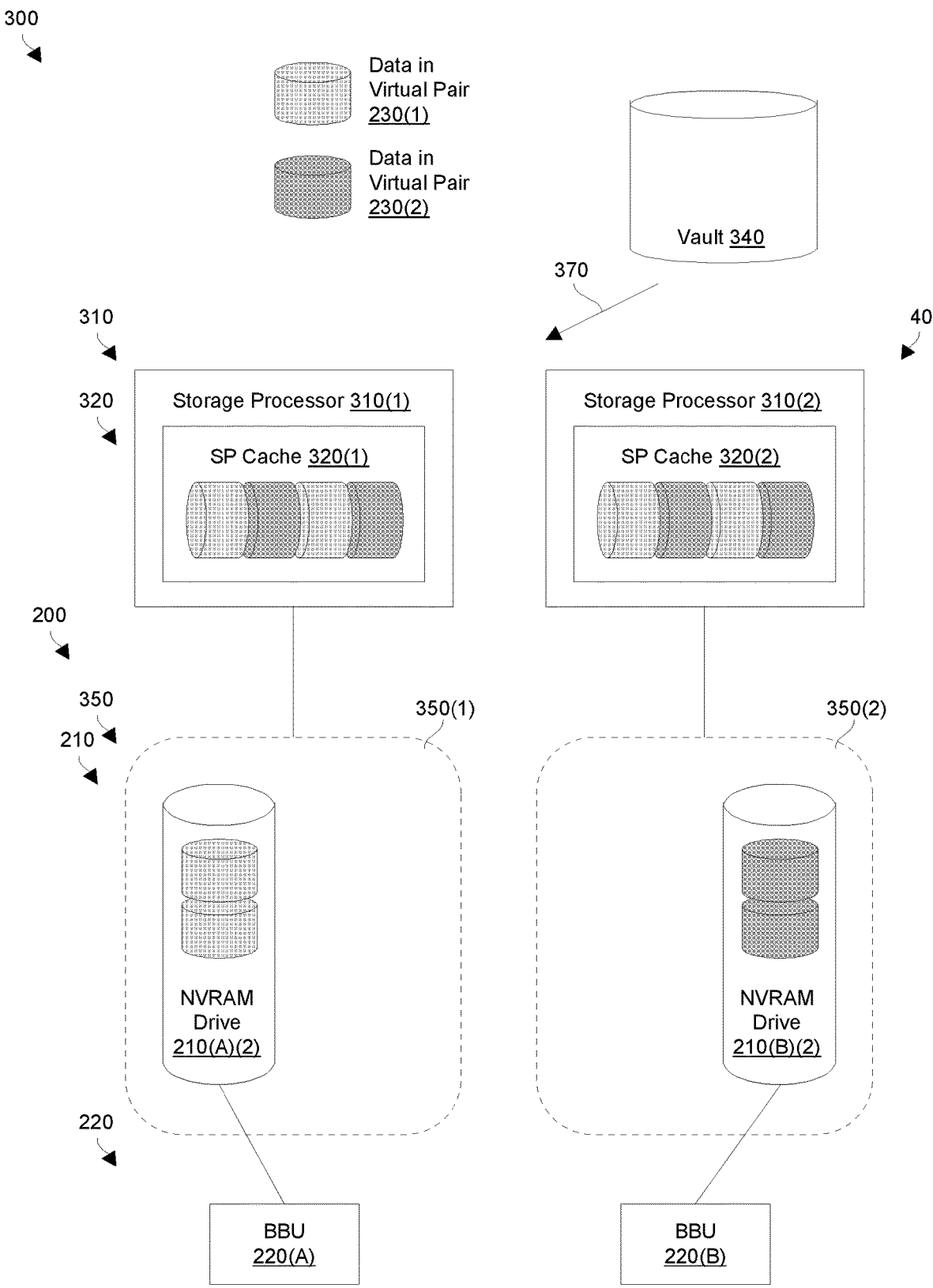
FIG. 8 is a block diagram of the example non-volatile cache at a fourth time during virtual pair reconfiguration.

FIGS. 5 through 8 show an example process 300 for maintaining availability of a non-volatile cache 200 in accordance with certain embodiments. FIG. 5 shows a plurality of NVRAM drives 210 arranged into initial drive sets that form the non-volatile cache 200. FIG. 6 shows the initial drive sets after failure of all of the NVRAM drives 210 of a particular initial drive set. FIG. 6 shows reconfiguration of remaining NVRAM drives 210 arranged into new drive sets that form the non-volatile cache 200. FIG. 8 shows the plurality of NVRAM drives 210 rearranged into the new drive sets and loading of vaulted data to resume operation of the non-volatile cache 200.

With attention to FIG. 5, the storage processing circuitry 40 (also see FIGS. 1 through 3) initially forms a non-volatile cache 200 from a plurality of NVRAM drives 210 arranged into initial drive sets. In particular, the non-volatile cache 200 initially includes a first virtual pair 230(1) having the NVRAM drives 210(A)(1), 210(B)(1) and a second virtual pair 230(2) having the NVRAM drives 210(A)(2), 210(B)(2).

As shown, the storage processing circuitry 40 includes multiple storage processors 310(1), 310(2) (collectively, storage processors 310) that perform data storage operations on behalf of a set of external hosts (also see the host devices 22 in FIG. 1). Each storage processor 310 includes an internal (or local) SP cache 320 for buffering data. That is, the storage processor 310(1) includes SP cache 320(1). Likewise, the storage processor 310(2) includes SP cache 320(2).

Due to redundancy as explained earlier in connection with FIGS. 3 and 4, the non-volatile cache 200 initially operates in an optimal state. In particular, the storage processing circuitry 40 operates a datapath by serving input/output (I/O) operations. Along these lines, the data that is buffered in the SP caches 320 is not removed or overwritten until the same data in the non-volatile cache 200 has been persisted elsewhere in the system (e.g., in secondary storage, in a mirroring cache, combinations thereof, etc.).

Along these lines, the storage processors 310 copy data buffered within the SP caches 320 into the non-volatile cache 200. In particular, the storage processor 310(1) copies some data from the SP cache 320(1) into the NVRAM drives 210(A)(1), 210(B)(1) and other data from the SP cache 320(1) into the NVRAM drives 210(A)(2), 210(B)(2). Likewise, the storage processor 310(2) copies some data from the SP cache 320(2) into the NVRAM drives 210(A)(1), 210(B)(1) and other data from the SP cache 320(2) into the NVRAM drives 210(A)(2), 210(B)(2).

With reference now to FIG. 6, suppose that all of the NVRAM drives 210 of an initial drive sets fails. In particular, suppose that both the NVRAM drive 210(A)(1) and the NVRAM drive 210(B)(1) of the virtual pair 230(1) fail. Because of this failure event, the data that resided in the virtual pair 230(1) is no longer available from the virtual pair 230(1). However, the same data still resides in the set of SP caches 320.

It should be understood that such a failure event may involve failure of the NVRAM drive 210(A)(1) and the NVRAM drive 210(B)(1) at the same time. For example, if both of the NVRAM drives 210(A)(1), 210(B)(1) were manufactured, shipped, installed, and utilized in the same manner, it could be possible for both of the NVRAM drives 210(A)(1), 210(B)(1) to fail at the same time.

However, such a failure event may also occur over the course of time. For example, the NVRAM drive 210(B)(1) may fail first and, while the operator is waiting for a replacement drive 210, the NVRAM drive 210(A)(1) may fail. It should be understood that, during the period of time after the NVRAM drive 210(B)(1) fails but before the NVRAM drive 210(A)(1) fails, the virtual pair 230(1) still provides access to the data, i.e., the data is cached in the NVRAM drive 210(A)(1). Accordingly, during this time, the non-volatile cache 200 remains available and operational, but is in a degraded state.

Once all of the NVRAM drives 210 of the virtual pair 230(1) have failed and the data in the virtual pair 230(1) is no longer accessible, the storage processing circuitry 40 takes remedial action. In particular, the storage processing circuitry 40 detects the failure of the virtual pair 230(1) and temporarily prevents (or halts) the storage processors 310 from performing any further data storage operations. That is, the detection of the failure of the virtual pair 230(1) serves as a trigger to perform non-volatile cache reconfiguration.

In response to detecting the failed initial drive set (i.e., the virtual pair 230(1)), the storage processing circuitry 40 begins non-volatile cache reconfiguration. In particular, the storage processing circuitry 40 performs a vaulting operation 330 that places a copy of the data that resided in the virtual pair 230(1) into a special non-volatile buffer (or vault) 340. In accordance with certain embodiments, the special non-volatile buffer 340 is SSD storage space residing within a set of SSDs (also see the storage devices 42 in FIG. 1). With the data that resided in the virtual pair 230(1) now in the non-volatile buffer 340, the data is reliably stored in the event of another failure such as loss of main power.

By way of example, the data that resided in the failed virtual pair 230(1) came from the caches 320 of both storage processors 310. Accordingly, the vaulting operation 330 involves copying data from both caches 320 into the non-volatile buffer 340.

With attention now to FIG. 7, further in response to detecting the failed initial drive set (i.e., the virtual pair 230(1)), the storage processing circuitry 40 rearranges the remaining non-failed NVRAM drives 210 into new drive sets 350 that form the non-volatile cache 200. In particular, the storage processing circuitry 40 creates new drive sets 350(1), 350(2). The new drive set 350(1) includes the NVRAM drive 210(A)(2) and the new drive set 350(2) includes the NVRAM drive 210(B)(2), both of which originally belonged to the initial virtual pair (or initial drive set) 230(2) when the non-volatile cache 200 began operation in the optimal state (FIG. 5).

With the non-volatile cache 200 now re-formed from the remaining non-failed NVRAM drives 210, the non-volatile cache 200 is ready for operation again. However, since there is at least one new drive set 350 that does not include a complete pair of NVRAM drives 210, the non-volatile cache 200 is in a degraded state.

With attention now to FIG. 8, the storage processing circuitry 40 restores the data from the vault 330 back into the non-volatile cache 200, and resumes the datapath to continue serving I/O operations. In particular, the storage processing circuitry 40 moves the data that resided in the virtual pair 230(1) from the non-volatile buffer 340 into the NVRAM drive 210(A)(2) which now forms the new drive set 350(1). With the log-structured storage now restored but in the degraded state, the storage processors 310 resume performing data storage operations. Accordingly, the non-volatile cache 200 remains available and the data storage equipment 24 (FIG. 1) as a whole remains operational.

It should be understood that the transition of the optimal state (FIG. 5) to the degraded (but still running) state (FIG. 8) may take a very short period of time such as only a few seconds at most (e.g., less than one second, a second, two seconds, five seconds, less than 10 seconds, etc.). Accordingly, there was no need to stop any applications running on the hosts (FIG. 1) and there was at most a few seconds of interruption. Accordingly, the above-described process avoids having to move the data storage equipment 24 offline as well as data unavailable situations.

It should be further understood that, in some situations, some of the new drive sets 350 may include a complete pair of operable NVRAM drives 210. For example, suppose there are initially three initial drive sets that include complete virtual pairs 230 of NVRAM drives 210. Then, if all of the NVRAM drives 210 of one of the initial drive sets fail, the rearranging process forms three new drive sets (i.e., the same number of drive sets) from the four remaining NVRAM drives 210. Accordingly, one of the new drive sets will include a complete pair of NVRAM drives 210.

A similar situation may occur if one of the failed NVRAM drives 210 of the failed virtual pair 230(1) were to come back after the storage processing circuitry 40 temporarily suspends (or halts) the datapath. In such a situation, one of the new drive sets 350(2) shown in FIGS. 7 and 8 may include a complete pair of NVRAM drives 210.

On the other hand, it should be understood that there may be multiple new drive sets 350 that are degraded and include only one NVRAM drive 210. For example, there may have been multiple initial drive sets which sustained a failure of just one NVRAM drive 210. Accordingly, when the new drive sets are created from the remaining NVRAM drives 210, there may be none or simply a few (e.g., one or two) new drive sets that include a complete pair of NVRAM drives 210.

It should further understood that there are a variety of ways of carrying out the vaulting operation 330 (FIG. 6). Along these lines, in accordance with some embodiments, the data stored in virtual pairs 230 that did not fail may be vaulted to, and un-vaulted from, the vault 330. For example, if there is enough space in the vault 330, the entire log may be buffered within the vault 330. Such operation frees up more NVRAM drives 210 for added flexibility when rearranging the remaining NVRAM drives 210 into the new drive sets. Further details will now be provided with reference to FIG. 9.

Figure 9:
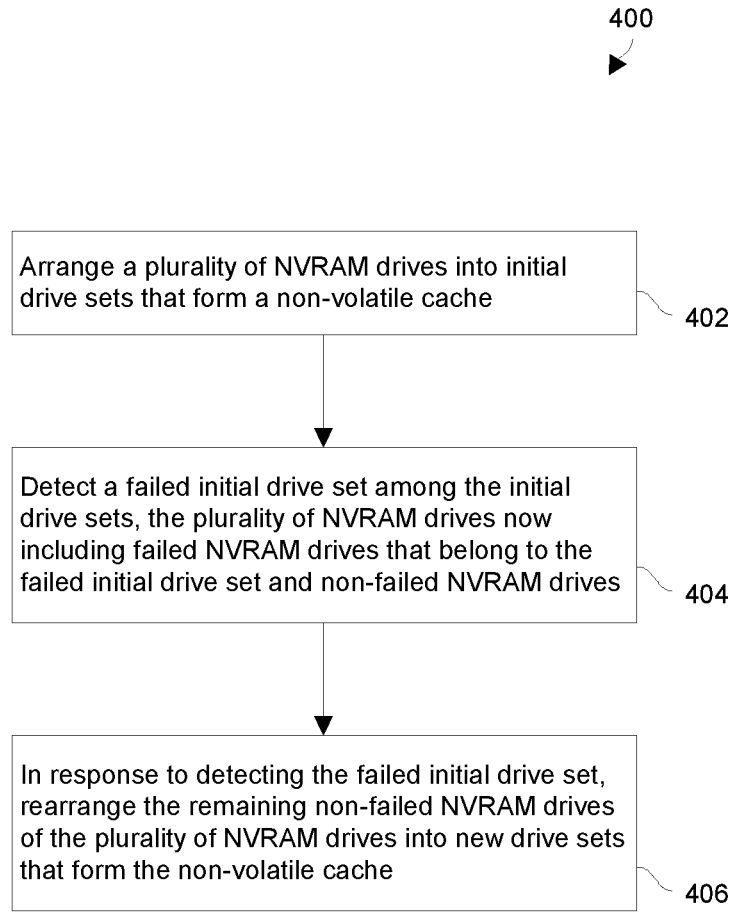
FIG. 9 is a flowchart of a procedure which is performed by a data storage environment in accordance with certain embodiments.

FIG. 9 is a flowchart of a procedure 400 which is performed by data storage equipment within a data storage environment to maintain availability of a non-volatile cache. Such a process simply suspends the datapath temporarily to rearrange virtual sets of NVRAM drives that form the non-volatile cache and avoids the need to move the data storage equipment offline.

At 402, the data storage equipment arranges a plurality of NVRAM drives into initial drive sets that form the non-volatile cache. In accordance with certain embodiments, each initial drive set includes a pair of NVRAM drives to hold mirrored data.

At 404, the data storage equipment detects a failed initial drive set among the initial drive sets. The plurality of NVRAM drives now include failed NVRAM drives that belong to the failed initial drive set and remaining non-failed NVRAM drives. In accordance with certain embodiments, both NVRAM drives of the pair in the initial drive set are determined to have failed.

At 406, the data storage equipment rearranges the remaining non-failed NVRAM drives of the plurality of NVRAM drives into new drive sets that form the non-volatile cache in response to detecting the failed initial drive set. Although some of the new drive sets may not include an operative a pair of NVRAM drives, but instead reside in a degraded state, the non-volatile cache operates thus enabling resumption of the datapath.

As described above, improved techniques are directed to maintaining availability of a non-volatile cache 200 by utilizing virtual NVRAM drive sets (e.g., virtual drive pairs). Here, NVRAM drives 210 may be configured into initial virtual drive sets 230 that form the non-volatile cache 200. However, if all of the NVRAM drives 210 of an initial virtual drive 230 set were to fail, the remaining NVRAM drives 210 may be reconfigured into new virtual drive sets 350 that form the non-volatile cache 200 (e.g., where each new virtual drive set includes at least one NVRAM drive 210). Accordingly, non-volatile cache availability is maintained even if all of the NVRAM drives 210 of an initial virtual drive set 230 are lost.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as one or more host computers 22 and/or one or more other devices 28 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that some data storage systems group NVRAM drives into fixed NVC (non-volatile cache) pairs. Each fixed (or physical) NVC pair has two NVRAM drives which link to different BBUs. If a single NVRAM drive in a pair is lost, the system could still work on degraded mode. However, if both drives in a pair are lost, the system will trigger a halt and vault (H&V) process and will be brought offline eventually. That is problem #1 for such data storage systems, i.e., loss of an NVC pair will cause system DU (data unavailable).

Once H&V happens due to one pair going offline, the data storage system cannot be brought back online until a new NVRAM drive replaces one of the failed NVRAM drives into the offline pair. Before that, data storage system remains in the DU state. That is problem #2 for such data storage systems, i.e., the system remains in the DU state until a new NVRAM drive is swapped in.

In order to solve problem #1, certain embodiments utilize virtual NVRAM drive pairs, i.e., groupings of NVRAM drives into software defined virtual pairs instead of fixed NVC pairs. For optimal fault tolerance, the two NVRAM drives in each virtual pair link to different BBUs. For example, suppose the system is configured with two pairs of NVRAM drives:

NVC Pair-1: drive_21 connected to BBU_A & drive_22 connected to BBU_B

NVC Pair-2: drive_23 connected to BBU_A & drive_24 connected to BBU_B The system could be reconfigured with two different pairs of NVRAM drives:

NVC Pair-1: drive_21 connected to BBU_A & drive_24 connected to BBU_B

NVC Pair-2: drive_23 connected to BBU_A & drive_22 connected to BBU_B Both configurations include two NVRAM drives that connect to different BBUs.

For problem #2, in accordance with certain embodiments, a halt&resume process handles a NVC pair offline error in a manner that does not result in system DU. Rather, the NVRAM drives are reconfigured via the use of virtual pairing. If one NVC pair goes offline while the other NVC pair is still optimal, the datapath is suspended (or halted) temporarily, and then restored with a new NVRAM drive configuration. Essentially, the new configuration includes two drive sets (or degraded pairs) so that there are the same number of drive sets as in the original non-volatile cache. Accordingly, the log tier can be restored (e.g., by writing the data from standby memory to both virtual pairs). The datapath is then resumed to continue serving IO.

With the improvements disclosed herein, it should be appreciated that the system can automatically recover once one NVC pair goes offline without requiring the system to enter the DU state. Rather, availability of the non-volatile cache is maintained.

In contrast to the improvement disclosed herein, it should be understood that a current H&V mechanism has two problems when handling one NVC pair offline in a system that uses two pairs. In particular: 1) the system will be offline when one NVC pair goes offline (i.e., half of the NVRAM drives in the system); and 2) the system will remain in the DU state until a new drive swapped in.

Nevertheless, in a system configured with two NVC pairs, the system can cope with two drives offline error because there are two redundant drives. However, if the pairs are fixed (e.g., due to traditional hardware BBU limits), then when two drives in one NVC pair go offline, the system will go offline too, even though there are two working drives in the other NVC pair. The drawback of this current system is that the NVRAM drives are bound (or physically fixed) into NVC pairs.

In the current system, the system will stay in DU until new drive(s) swapped in. This may seem reasonable because the system has lost its critical drives. But if problem #1 is solved without swapping in new drive(s), the system actually has enough redundancy to recover automatically. So, DU is not really necessary.

In order to avoid system entering DU state when one NVC pair offline, virtual pairs are employed thus using NVRAM drives in a more flexible way. Here, a new method is employed which may be referred to as Halt&Restore to automatically resume the system's availability after one of NVC pairs goes offline.

It should be appreciated that the current system uses NVRAM drives in a fixed way, i.e., drive slots are bound to specific NVC pairs. However, in accordance with certain improved embodiments, two drives in one pair may still have access to different BBU backup, but the drives now have the flexibility of being paired virtually (e.g., via software configuration).

Suppose there are two combinations for four NVRAM drives to make two pairs which abide by the rule: two drives in one pair have different BBU backup. Generally speaking, there are 2N−1 combinations for N drives to make pairs. The current system implementation uses only one. But a virtual pair implementation may use all of the 2N choices and allow configuration of different combinations.

As mentioned earlier, FIGS. 3 and 4 show two different virtual pairing combinations in a four NVRAM drive system. With 2N NVRAM drives, there are 2N−1 virtual pair combinations. In accordance with certain embodiments, once there is one virtual pair offline, there's always another combination that can make all virtual pairs degraded unless more than half the NVRAM drives are offline.

Virtual pair re-combining is simple. The task is to change to another combination.

In accordance with certain embodiments and in general, assume there are N virtual pairs with 2N NVRAM drives. Once there is one virtual pair offline, the workflow of virtual pair conversion may be described as follows:

1. Group NVRAM drives by linked BBU. That is, put drives that linked with same BBU into same group.
2. From each group, select N/2 drives to get total N drives.
3. Put the N drives into N new virtual pairs.
4. If there are still remaining drives, for each new virtual pair, from the groups generated in Step 1 select one drive and put the drive into the new virtual pair. The selecting rule is the two drives are from different groups. If there is no drive that satisfies the rule, move to the next new virtual pair.
5. Repeat Step 4 until all drives have been put into virtual pairs.

As explained earlier in connection with FIG. 7, an initial virtual pair configuration may be converted to a new virtual pair configuration. Such reconfiguration provides for a Halt&Restore method that may automatically restore log tiers to continue serving IO. Since a non-volatile cache can automatically recover to available state, then the log tiers can also automatically recover. So for the system, entering DU state is no longer necessary.

Though the new Halt&Restore method won't cause DU, it may still make sense to temporarily suspend (or halt) operation of the datapath IO service. In accordance with certain embodiments, the workflow is:

1. Halt the Datapath. This may be carried out in a manner similar to the halt in a Halt&Vault procedure;
2. Perform virtual pair conversion to make all Virtual Pairs degraded or optimal.
3. Restore log tiers. Here, RAID metadata may be modified to bring log tiers into an operational but degraded state. Along these lines, in-memory log data may be used to rebuild log tiers.
4. Resume the datapath to continue serving IO.

FIGS. 5 through 8, as mentioned earlier, show an example that uses a Halt&Restore method to make a system available again. In accordance with certain embodiments, 1. This method can prevent storage system from entering offline state once one NVC pair offline.
2. This method can prevent storage system stay in DU state once one NVC pair offline.
3. This method is compactable with current design and easy to implement. As described above, such a method may avoid the system having to enter a data unavailable state when half of NVC pairs offline. Rather, via reconfiguration, the system may automatically resume datapath operation.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

For example, the non-volatile cache 200 was described above as using virtual pairs of NVRAM drives 210. In other embodiments, the non-volatile cache 200 utilizes groups of NVRAM drives 210 that provide a different level of fault tolerance (e.g., RAID5, RAID 6, etc.). Such modifications and enhancements are intended to belong to various embodiments of the disclosure.

What is claimed is:

1. A method of maintaining availability of a non-volatile cache, the method comprising:
arranging a plurality of non-volatile random-access memory (NVRAM) drives into initial drive sets that form the non-volatile cache;
detecting a failed initial drive set among the initial drive sets, the plurality of NVRAM drives now including failed NVRAM drives that belong to the failed initial drive set and remaining non-failed NVRAM drives; and in response to detecting the failed initial drive set, rearranging the remaining non-failed NVRAM drives of the plurality of NVRAM drives into new drive sets that form the non-volatile cache;

wherein arranging the plurality of NVRAM drives into the initial drive sets includes:
creating a number of initial drive sets from the plurality of NVRAM drives; and wherein rearranging the remaining non-failed NVRAM drives includes:
creating a number of new drive sets from the remaining non-failed NVRAM drives that equals the number of initial drive sets created from the plurality of NVRAM drives.

2. A method as in claim 1 wherein the failed initial drive set includes a pair of NVRAM drives; and
wherein detecting the failed initial drive set includes:
sensing that each NVRAM drive of the pair of NVRAM drives has failed.

3. A method as in claim 1 wherein the plurality of NVRAM drives includes a first group of NVRAM drives that receives power from a first battery backup unit (BBU) and a second group of NVRAM drives that receives power from a second BBU; and
wherein arranging the plurality of NVRAM drives into the initial drive sets includes:
creating each initial drive set from an NVRAM drive of the first group and an NVRAM drive of the second group.

4. A method as in claim 1, further comprising:
prior to detecting the failed initial drive set, copying data from a buffer of a storage processor into each NVRAM drive of the failed initial drive set; and
in response to detecting the failed initial drive set, copying the data from the buffer of the storage processor into standby storage.

5. A method as in claim 4, further comprising:
after rearranging the remaining non-failed NVRAM drives of the plurality of NVRAM drives into the new drive sets, loading the copied data from the standby storage into one of the new drive sets.

6. A method as in claim 5, further comprising:
after rearranging the remaining non-failed NVRAM drives of the plurality of NVRAM drives into the new drive sets, reloading the copied data into the buffer of the storage processor.

7. A method as in claim 6, further comprising:
prior to detecting the failed initial drive set, performing data storage operations from the storage processor, the data storage operations caching data within log-structured storage provided by the non-volatile cache.

8. A method as in claim 7, further comprising:
in response to detecting the failed initial drive set, halting a datapath that includes the log-structured storage; and
after the copied data is loaded from the standby storage into the one of the new drive sets and after the copied data is reloaded into the buffer of the storage processor, resuming the datapath that includes the log-structured storage.

9. A method as in claim 1 wherein arranging the plurality of NVRAM drives into initial drive sets that form the non-volatile cache includes:
constructing initial virtual NVRAM storage objects from the plurality of NVRAM drives, each initial virtual NVRAM storage object including a pair of NVRAM drives operating as a mirror to store mirroring copies of data.

10. A method as in claim 7 wherein rearranging the remaining non-failed NVRAM drives of the plurality of NVRAM drives includes:
constructing new virtual NVRAM storage objects from the remaining non-failed NVRAM drives of the plurality of NVRAM drives, each new virtual NVRAM storage object including a pair of NVRAM drives operating as a mirror to store mirroring copies of data.

11. A method as in claim 1 wherein the failed initial drive set includes a pair of NVRAM drives; and
wherein the method further comprises:
prior to detecting the failed initial drive set, operating the pair of NVRAM drives in an optimal state in which each of a first NVRAM drive and a second NVRAM drive of the pair of NVRAM drives stores a respective copy of data to form a mirror.

12. A method as in claim 11, further comprising:
after the pair of NVRAM drives operates in the optimal state and prior to detecting the failed initial drive set, operating the pair of NVRAM drives in a degraded state in which one of first and second NVRAM drives has failed and another of the first and second NVRAM drives continues to store a respective copy of the data.

13. A method as in claim 12 wherein detecting the failed initial drive set includes:
detecting that each of the first NVRAM drive and the second NVRAM drive of the pair of NVRAM drives has failed.

14. Data storage equipment, comprising:
memory; and
control circuitry coupled to the memory, the memory storing instructions which, when carried out by the control circuitry, cause the control circuitry to perform a method of:
arranging a plurality of non-volatile random-access memory (NVRAM) drives into initial drive sets that form a non-volatile cache,
detecting a failed initial drive set, the plurality of NVRAM drives now including failed NVRAM drives that belong to the failed initial drive set and remaining non-failed NVRAM drives, and
in response to detecting the failed initial drive set, rearranging the remaining non-failed NVRAM drives of the plurality of NVRAM drives into new drive sets that form the non-volatile cache;
wherein arranging the plurality of NVRAM drives into the initial drive sets includes:
creating a number of initial drive sets from the plurality of NVRAM drives; and
wherein rearranging the remaining non-failed NVRAM drives includes:
creating a number of new drive sets from the remaining non-failed NVRAM drives that equals the number of initial drive sets created from the plurality of NVRAM drives.

15. Data storage equipment as in claim 14 wherein the failed initial drive set includes a pair of NVRAM drives; and
wherein detecting the failed initial drive set includes:
sensing that each NVRAM drive of the pair of NVRAM drives has failed.

16. Data storage equipment as in claim 15 wherein the plurality of NVRAM drives includes a first group of NVRAM drives that receives power from a first battery backup unit (BBU) and a second group of NVRAM drives that receives power from a second BBU; and wherein creating the number of initial drive sets from the plurality of NVRAM drives includes:

creating each initial drive set from an NVRAM drive of the first group and an NVRAM drive of the second group.

17. Data storage equipment as in claim 14 wherein the method further includes:

prior to detecting the failed initial drive set, copying data from a buffer of a storage processor into each NVRAM drive of the failed initial drive set; and in response to detecting the failed initial drive set, copying the data from the buffer of the storage processor into standby storage.

18. A computer program product having a non-transitory computer readable medium which stores a set of instructions to maintain availability of a non-volatile cache; the set of instructions, when carried out by computerized circuitry, causing the computerized circuitry to perform a method of:

arranging a plurality of non-volatile random-access memory (NVRAM) drives into initial drive sets that form the non-volatile cache;

detecting a failed initial drive set, the plurality of NVRAM drives now including failed NVRAM drives that belong to the failed initial drive set and remaining non-failed NVRAM drives; and in response to detecting the failed initial drive set, rearranging the remaining non-failed NVRAM drives of the plurality of NVRAM drives into new drive sets that form the non-volatile cache;

wherein arranging the plurality of NVRAM drives into the initial drive sets includes:

creating a number of initial drive sets from the plurality of NVRAM drives; and wherein rearranging the remaining non-failed NVRAM drives includes:

creating a number of new drive sets from the remaining non-failed NVRAM drives that equals the number of initial drive sets created from the plurality of NVRAM drives.

19. A method of maintaining availability of a non-volatile cache, the method comprising:

arranging a plurality of non-volatile random-access memory (NVRAM) drives into initial drive sets that form the non-volatile cache;

detecting a failed initial drive set among the initial drive sets, the plurality of NVRAM drives now including failed NVRAM drives that belong to the failed initial drive set and remaining non-failed NVRAM drives; and in response to detecting the failed initial drive set, rearranging the remaining non-failed NVRAM drives of the plurality of NVRAM drives into new drive sets that form the non-volatile cache;

wherein the method further comprises:

prior to detecting the failed initial drive set, copying data from a buffer of a storage processor into each NVRAM drive of the failed initial drive set; and in response to detecting the failed initial drive set, copying the data from the buffer of the storage processor into standby storage.

20. A method as in claim 19, further comprising:

after rearranging the remaining non-failed NVRAM drives of the plurality of NVRAM drives into the new drive sets, loading the copied data from the standby storage into one of the new drive sets.

\* \* \* \* \*